May 13, 1952
L. C. SCHAEFFER
2,596,604
KITCHEN UTENSIL FOR SLICING AND
CUTTING ARTICLES OF FOOD
Filed Sept. 8, 1947
2 SHEETS—SHEET 2
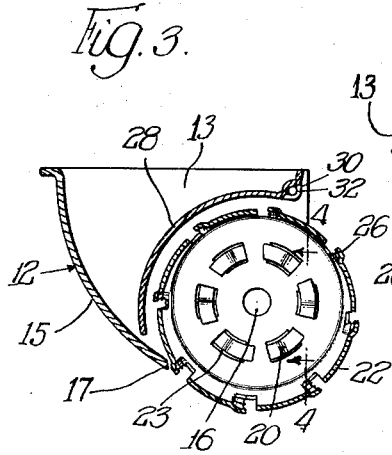
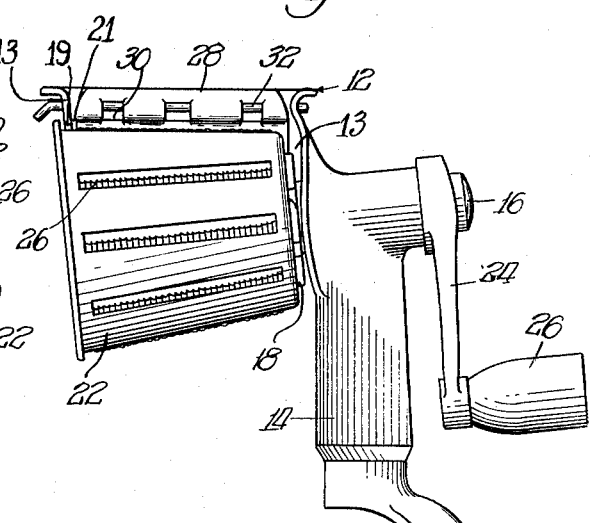
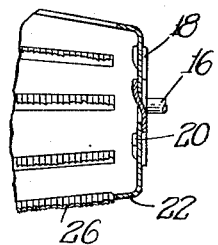
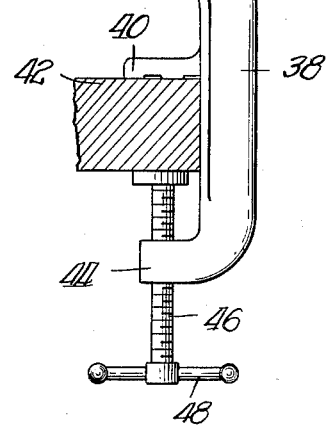
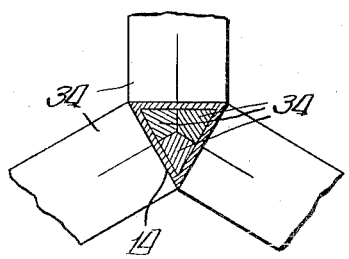
INVENTOR.
Lewis C. Schaeffer,
BY
Wilkinson, Huxley, Byron & Hume
Attys Patented May 13, 1952

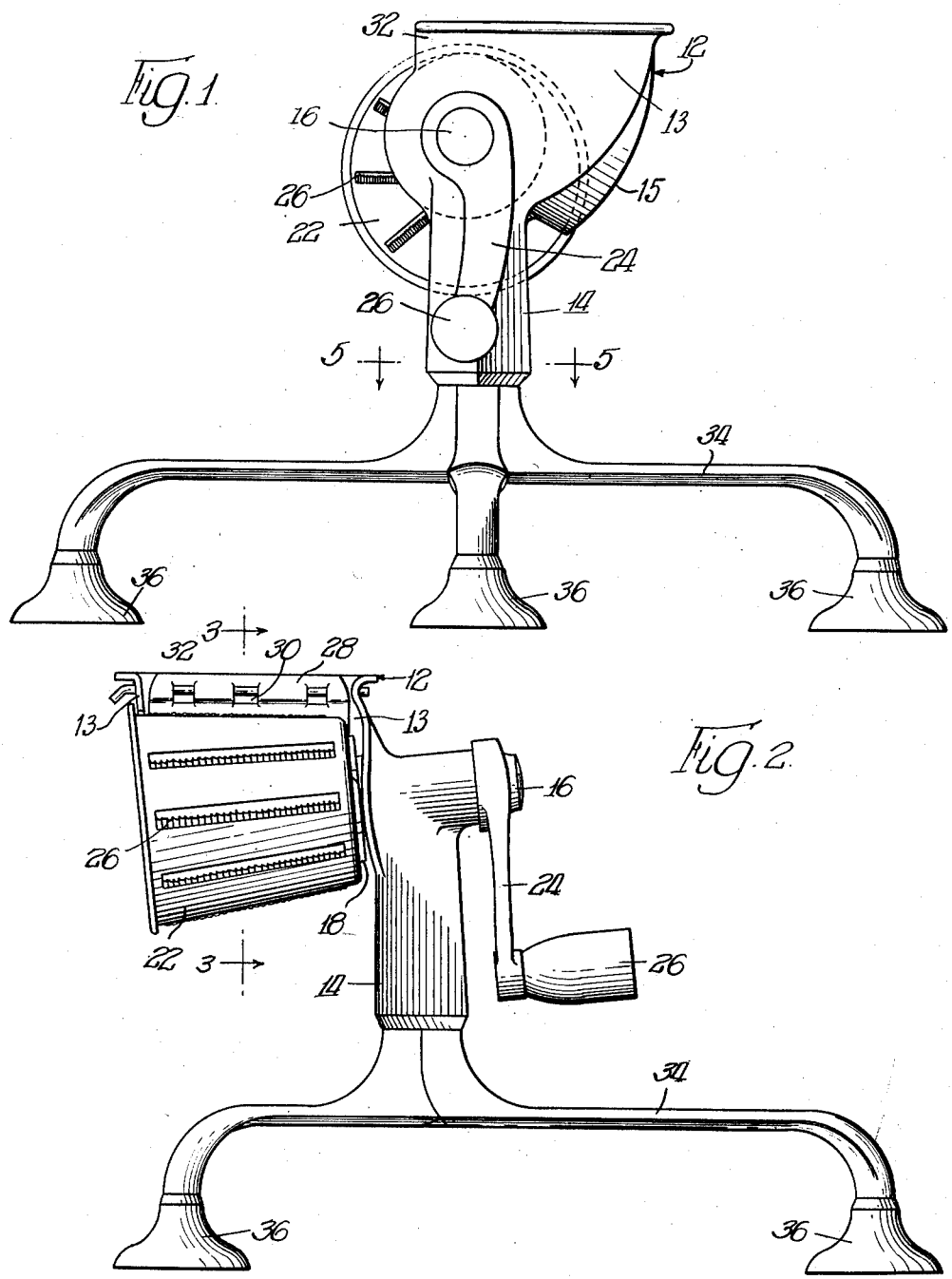

2,596,604

UNITED STATES PATENT OFFICE 2,596,604

KITCHEN UTENSIL FOR SLICING AND CUTTING ARTICLES OF FOOD

Lewis C. Schaeffer, Fremont, Ind., assignor to Kitchen-Quip, Inc., Fort Wayne, Ind., a corporation of Indiana Application September 8, 1947, Serial No. 772,799

1 Claim. (Cl. 146—92)

The present invention relates to improvements in food cutters.

It is an object of this invention to provide a food cutter which is simple in construction and economical to manufacture.

Another object is to provide a food cutter which may be disassembled quickly for cleaning and storage purposes.

A further object is to provide a food cutter which is safe and efficient in operation.

Another object is to provide a food cutter which may be secured to a table or supporting surface and which may also be operated without being so secured.

With these and various other objects in view, the invention may consist of certain novel features of construction and operation as will be more fully described and particularly pointed out in the specification, drawings and claim appended hereto.

In the drawings, which illustrate an embodiment of the device, and wherein like reference characters are used to designate like parts—

Fig. 1 is a rear elevation of a device embodying the invention;

Fig. 2 is a side elevation of the device shown in Fig. 1;

Fig. 3 is a sectional elevation taken on the line 3—3 of Fig. 2;

Fig. 4 is a fragmentary sectional elevation taken on the line 4—4 of Fig. 3;

Fig. 5 is a fragmentary sectional view taken on the line 5—5 of Fig. 1; and

Fig. 6 is a side elevation showing the device secured to a supporting surface.

Referring to the drawings more in detail, the hopper member 12 is an aluminum casting and is provided with a downwardly extending stem portion 14. The upper portion of the stem 14 is drilled to provide a bearing for the crank shaft 16. Secured to the inner end of the crank shaft is a disk 18 which is provided with a plurality of spaced peripheral lugs or ears 20. These lugs are formed by making an L-shaped cut in the edge of the disk 18 and bending the ends outwardly.

The cutter 22 has the contour of a truncated cone and is open at its larger or outer end. The inner end is closed and is provided with a plurality of spaced slots 23 corresponding to the lugs 20 and positioned to be engaged by the lugs. The open portion of the lugs face in a counterclockwise direction when viewed as in Fig. 1 so that, when the crank shaft 16 is rotated in a clockwise direction by means of the crank 24 and handle 26, the lugs in the slots drive the cutter 22. The cutter is provided with a plurality of slots and outwardly projecting knife edges 26. The number and size of these will be determined by the type of cutting that is desired. The cutter may be easily replaced or removed for cleaning by merely holding the crank shaft 16 stationary and rotating the cutter in a counterclockwise direction. The lugs 20 will then become disengaged from the slots 23 enabling the cutter to be removed.

The top of the cutter in operating position is substantially horizontal and necessarily the shaft 16 must have its axis slanting downwardly slightly to compensate for the truncated cone contour of the cutter. The bottom of the cutter will, of course, be on a slant and the food passing through the cutting slots will more readily pass out the open end of the cutter.

The hopper 12 is provided with a safety feed cover 28, as shown more clearly in Fig. 3. This cover is of such shape as to substantially cover the portion of the cutter 22 which is exposed to the interior of the hopper when it is in lowered position. The upper edge of the cover has spaced, offset lugs or eyes 30 through which a removable pin 32 is passed to hingedly connect the cover to the top of the hopper. The hopper 12 is provided with openings at each side adjacent the top for supporting the pin 32 which may be easily withdrawn from the eyes 30 and hopper 12 to facilitate cleaning the device.

Referring to Fig. 5, the stem 14 of the hopper member is hollow and triangular in cross-section. As shown in Figs. 1 and 2, three supporting legs 34 have their upper portions inserted within the stem 14 of the hopper member. The upper ends of the legs are triangular in cross-section so that, when the outer ends of the legs are equidistant from each other, the inner ends when placed together have an outside contour corresponding substantially to that of the inside of the stem 14. This provides a rigid, readily removable support for the device and each of the legs being separable from each other greatly reduces the space required for storage. The lower ends of the legs are provided with rubber suction cups 36 or similar attachments to prevent slipping.

Fig. 6 shows a modification of the supporting means for securing the device to a table or other supporting surface. The clamp 38 is provided with an upper inwardly offset lug 40 for engaging the top of the supporting surface 42. The lower lug 44 is internally threaded to accommodate the set screw 46. By rotating the handle 48, the screw 46 may be tightened against the under surface of the supporting member 42 which will hold the upper lug 40 in engagement with the top surface. The upper end of the clamp 38 is triangular in cross-section corresponding to the interior of the stem 14 and adapted to be received therein for removably supporting the device.

In operation, the material to be cut is placed in the hopper 12 and the safety feed cover 28 is lowered onto it, the cover pivoting on the pin 32 through the eyes 30 at its upper edge. Downward pressure may then be exerted on the cover causing the material to pass through the knife slots 26 as the cutter 22 is rotated. Rotation of the crank 24 by the handle 26 rotates the shaft 16 and disk 18 and the lugs 20 on the disk engaging the slots 23 on the cutter causes the latter to rotate. It will be noted that the hopper may be completely evacuated by exerting pressure on the safety feed cover without danger of the fingers contacting the cutter. The lower portion of the cutter being inclined outwardly and the outer end being larger than the inner, the material passing through the knife slots into the interior of the cutter tends to pass out the open end of it.

The cutters 22 may have any number and spacing of cutting edges and apertures to suit the particular cutting operation. The cutters are readily interchangeable and may be removed by merely holding the crank shaft stationary and giving the cutter a slight twist in a clockwise direction so that the lugs 20 on the disk 18 pass through the slots 23 and the cutter is lifted out.

It will be appreciated from consideration of the foregoing description and the drawings that the casing or hopper structure has really only three sides and is open both at the top and bottom and on one side. These sides are constituted by two opposite side walls 13 and the intermediate side wall 15 with respect to the lower edge of which the cone cutter 22 operates with a clearance, as indicated at 17 in Figure 3, and which intermediate wall 15 is curved downwardly and inwardly, as shown in this figure. Also the one side wall 13 has a curved inner edge 19 shaped to conform with the wide open end of the cone cutter and providing a clearance with respect to the latter, as indicated at 21 in Figure 6. This casing construction has the advantage that there are no inside corners which can clog and the entire interior thereof can be readily and easily cleaned when the cone cutter is removed, the latter forming, in effect, both the bottom and one side of the hopper when in use.

It is to be understood that the present invention is not to be limited by the exact embodiment of the device shown, which is merely by way of illustration and not limitation, as various other forms of the device will, of course, be apparent to those skilled in the art without departing from the spirit of the invention or the scope of the claim.

I claim:

A kitchen utensil for slicing and cutting articles of food comprising an integral cast body forming a hopper in which the article of food is supported while being presented to the cutter, a bearing portion, and a downwardly extending stem portion, said hopper having sides with the upper edges thereof disposed in a substantially horizontal plane, one of said sides merging with said bearing and stem portions, a hole defined in said bearing portion and extending through the side merging with said bearing portion, a crank shaft extending through said hole, a rotatable hollow truncated cone cutter having an open outer end and a closed inner end, means carried on one end of said shaft upon which said inner end of said cutter is detachably mounted, a crank on the other end of said shaft, the hole in said bearing portion being slanted downwardly to dispose the top of said cutter substantially horizontal, the other of said hopper sides being shaped to provide circumferential rotational clearance with and adjacent to the outer open end of said cutter, a further side of said hopper having an upper edge in said plane and connecting said first and second sides and sloping downwardly and toward the lower portion of said cutter and being shaped to provide circumferential rotational clearance with said cutter, said sides of said hopper providing a receptacle opened at the top and at a lower end, with said cutter disposed in and closing said lower end, the axis of rotation of said shaft and cutter being generally disposed to one side of said receptacle to provide increasing clearance between said cutter and said further side from a point below said axis and extending upwardly toward said plane, the greater part of the cutting surface of said cutter being fully exposed for detachably connecting the cutter to said means with only a minor part of the cutting surface of said cutter closing the lower end of said receptacle.

LEWIS C. SCHAEFFER.

REFERENCES CITED

The following references are of record in the file of this patent:

UNITED STATES PATENTS

| Number | Name | Date |
|---|---|---|
| 422,644 | Shepard | Mar. 4, 1890 |
| 939,951 | Myers et al. | Nov. 9, 1909 |
| 1,372,239 | Kutter | Mar. 22, 1921 |
| 1,806,600 | Elderkin | May 26, 1931 |
| 2,055,761 | Gerschefski | Sept. 29, 1936 |
| 2,128,792 | Berarducci | Aug. 30, 1938 |
| 2,218,583 | Marlhaler | Oct. 22, 1940 |

FOREIGN PATENTS

| Number | Country | Date |
|---|---|---|
| 460 | Great Britain | Jan. 10, 1890 |
| 284,130 | Germany | May 5, 1915 |